US012318788B2

(12) United States Patent
Ooyama et al.

(10) Patent No.: US 12,318,788 B2
(45) Date of Patent: Jun. 3, 2025

(54) CENTRIFUGE HAVING A CONTROL DEVICE FOR RELEASING DOORLOCK BY INPUT OF PASSCODE

(71) Applicant: Eppendorf Himac Technologies Co., Ltd., Ibaraki (JP)

(72) Inventors: Hisanobu Ooyama, Ibaraki (JP); Hiroyuki Takahashi, Ibaraki (JP)

(73) Assignee: Eppendorf Himac Technologies Co., Ltd., Ibaraki (JP)

( * ) Notice: Subject to any disclaimer, the term of this patent is extended or adjusted under 35 U.S.C. 154(b) by 886 days.

(21) Appl. No.: 16/629,954

(22) PCT Filed: Jun. 29, 2018

(86) PCT No.: PCT/JP2018/024850

§ 371 (c)(1),
(2) Date: Jan. 9, 2020

(87) PCT Pub. No.: WO2019/013021

PCT Pub. Date: Jan. 17, 2019

(65) Prior Publication Data

US 2021/0039114 A1 Feb. 11, 2021

(30) Foreign Application Priority Data

Jul. 11, 2017 (JP) ............................ JP2017-135198

(51) Int. Cl.
*B04B 7/06* (2006.01)
*B04B 13/00* (2006.01)

(52) U.S. Cl.
CPC ................ *B04B 7/06* (2013.01); *B04B 13/00* (2013.01)

(58) Field of Classification Search
CPC .................................. B04B 7/06; B04B 13/00
(Continued)

(56) References Cited

U.S. PATENT DOCUMENTS 6,778,288 B1 * 8/2004 Ogaki .................. H04N 1/0035 399/87
2003/0199379 A1 10/2003 Schneider et al.
2015/0174592 A1 * 6/2015 Ooyama ................. B04B 15/08 494/10

FOREIGN PATENT DOCUMENTS

CN 1810382 8/2006
CN 201269979 7/2009
(Continued)

OTHER PUBLICATIONS

"Use a passcode with you iPhone, iPad, or iPod touch—Apple Support." www.apple.com, Apr. 30, 2024, https://support.apple.com/en-us/119586.*

(Continued)

*Primary Examiner* — Krishnan S Menon
*Assistant Examiner* — Shuyi S. Liu
(74) *Attorney, Agent, or Firm* — JCIPRNET

(57) ABSTRACT

Provided is a centrifuge capable of improving user operability. The centrifuge has a rotor chamber and a door for opening and closing the rotor chamber, wherein the centrifuge includes a presence and absence detection part for detecting presence or absence of a rotor, a door locking mechanism capable of switching between a locked state for inhibiting opening of the door and an unlocked state for allowing opening of the door, and a first control part configured to perform an operation of setting the door locking mechanism to be the unlocked state when the rotor is accommodated in the rotor chamber and configured to set the door locking mechanism to be the unlocked state when an unlocking passcode is input.

8 Claims, 10 Drawing Sheets

10 : CENTRIFUGE
12 : DOOR
16 : DOOR LOCKING MECHANISM
23 : ROTOR CHAMBER
47 : PRESENCE AND ABSENCE DETECTION PART, STOP DETECTION PART, FIRST CONTROL PART, SECOND CONTROL PART

(58) Field of Classification Search
USPC .......................................... 494/1, 7, 9, 10, 60
See application file for complete search history.

(56) References Cited

FOREIGN PATENT DOCUMENTS

| | | | |
|---|---|---|---|
| CN | 201735458 | 2/2011 | |
| CN | 103813858 | 5/2014 | |
| CN | 104722413 | 6/2015 | |
| CN | 205436048 | 8/2016 | |
| JP | 2003135994 | 5/2003 | |
| JP | 2007130609 | 5/2007 | |
| JP | 2010042350 | 2/2010 | |
| JP | 2012152718 | 8/2012 | |
| JP | 2012250156 | 12/2012 | |
| JP | 2015116541 | 6/2015 | |
| WO | WO-2016107088 A1 * | 7/2016 | ............ G06Q 50/12 |

OTHER PUBLICATIONS

"International Search Report (Form PCT/ISA/210) of PCT/JP2018/024850," dated Aug. 28, 2018, with English translation thereof, pp. 1-3.
"Office Action of China Counterpart Application", dated Feb. 20, 2021, with English translation thereof, pp. 1-16.

* cited by examiner

10 : CENTRIFUGE
12 : DOOR
16 : DOOR LOCKING MECHANISM
23 : ROTOR CHAMBER
47 : PRESENCE AND ABSENCE DETECTION PART, STOP DETECTION PART, FIRST CONTROL PART, SECOND CONTROL PART

CENTRIFUGE HAVING A CONTROL DEVICE FOR RELEASING DOORLOCK BY INPUT OF PASSCODE

CROSS-REFERENCE TO RELATED APPLICATION

This application is a 371 application of the International PCT application serial no. PCT/JP2018/024850, filed on Jun. 29, 2018, which claims the priority benefit of Japan Patent Application No. 2017-135198, filed on Jul. 11, 2017. The entirety of each of the above-mentioned patent applications is hereby incorporated by reference herein and made a part of this specification.

BACKGROUND

Technical Field

The invention relates to a centrifuge which performs various centrifugal treatments such as precipitation separation, purification, concentration and the like on a sample by a centrifugal force using a mixture of a liquid and a solid or a mixture of liquids as the sample.

Description of Related Art

In the fields of medicine, pharmacy, genetic engineering and the like, a centrifugal separator, that is, a centrifuge, is used to perform a process such as precipitation separation using a mixture of a liquid and a solid or a mixture of liquids as the sample. An example of a centrifuge is described in Patent literature 1 (Japanese Patent Application Laid Open No. 2007-130609). The centrifuge described in Patent literature 1 includes a chamber which accommodates a rotor, a door which opens and closes an opening portion of the chamber, a door solenoid which switches a closed state of the door between locked and unlocked, a control part which is connected to the door solenoid, and a driving device which rotates and stops the rotor.

The driving device has a motor, and a rotation detector which detects the number of rotations of the motor and the rotor is provided. The control part is connected to an operation panel. A detection signal of the rotation detector is input to the control part. A personal computer is connected to the control part. The personal computer has a storage device, and a program which operates the control part is stored in the storage device. A non-contact card reader is connected to the personal computer.

When a user operates the operation panel to input a user identification code, the control part stores the user identification code. Since the door solenoid keeps the door locked after the centrifuge stops, the sample cannot be taken out from the chamber. When a user who is carrying a non-contact type IC card in which the user identification code is recorded owns a sample set in a rotor and enters a communication range of the non-contact type card reader, the user identification code stored in advance is collated with the user identification code recorded in the non-contact type IC card. When the two identification codes match with each other, operation of the centrifuge is allowed, the locking of the door by the door solenoid is released, and the sample can be taken out from the chamber by opening the door.

SUMMARY

Problems to be Solved

Incidentally, in the centrifuge described in Japanese Patent Laid-Open No. 2007-130609, a function of a door locking mechanism is not taken into account when there is no rotor in a rotor chamber, and there is room for improvement in that respect.

The invention provides a centrifuge which is able to enhance user operability.

Means to Solve Problems

According to one embodiment, there is provided a centrifuge, including a rotor chamber that accommodates a rotor which supports a sample, and a door that opens and closes the rotor chamber. The centrifuge includes a presence and absence detection part that detects whether or not the rotor is accommodated in the rotor chamber; a locking mechanism that switches between a locked state in which opening of the door is prevented and an unlocked state in which the opening of the door is allowed; and a first control part that performs an operation of setting the locking mechanism to be in an unlocked state when the rotor is accommodated in the rotor chamber and configured to set the locking mechanism to be in the unlocked state when a passcode for unlocking is input.

Effect of Invention

In the centrifuge according to one embodiment, when the rotor is accommodated in the rotor chamber, an operation of setting the locking mechanism to be in an unlocked state is performed, and when a passcode for unlocking is input, the locking mechanism is brought into the unlocked state. Therefore, user operability is improved.

DESCRIPTION OF THE EMBODIMENTS

Hereinafter, an embodiment of a centrifuge according to the invention will be described in detail with reference to the drawings.

Figure 1:
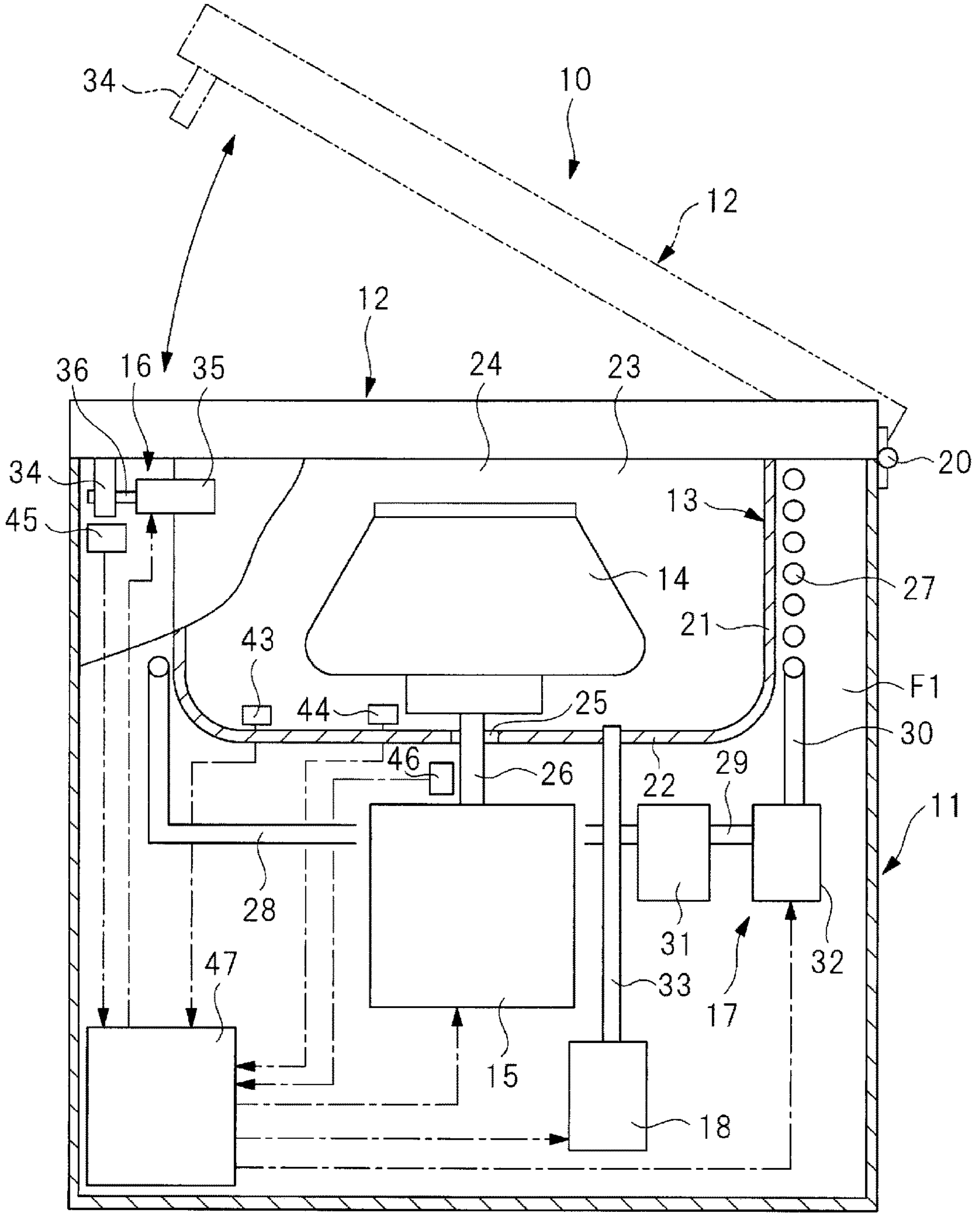
FIG. 1 is a cross-sectional view showing an embodiment of a centrifuge of the invention.

A centrifuge 10 shown in FIG. 1 includes a main body 11, a door 12, an accommodation container 13, a rotor 14, an electric motor 15, a door locking mechanism 16, a cooling device 17, and a vacuum pump 18. The main body 11 is formed in a box shape of materials such as a metal and a synthetic resin. The door 12 is mounted in the main body 11 by a hinge 20, and the door 12 can be operated within a predetermined angle range with the hinge 20 as a fulcrum. The door 12 may be a structure manually operated by a user or a structure operated by an actuator. The actuator includes an electric motor and a solenoid.

The accommodation container 13 is provided in an inside F1 of the main body 11. The accommodation container 13 is made of a metal. The accommodation container 13 has a tubular portion 21 and a bottom portion 22. A rotor chamber 23 is formed inside the accommodation container 13. The accommodation container 13 is disposed in a manner that an opening portion 24 of the rotor chamber 23 faces upward in the vertical direction. A shaft hole 25 is provided to pass through the bottom portion 22. When the door 12 is operated with the hinge 20 as a fulcrum, the door 12 opens and closes the opening portion 24.

A seal member is provided to surround the opening portion 24. The seal member may be provided on any one of the main body 11 and the accommodation container 13. When the door 12 closes the opening portion 24 as shown by a solid line, the seal member comes into contact with a surface of the door 12 and forms a seal surface. That is, the rotor chamber 23 is sealed. When the door 12 opens the opening portion 24 as indicated by a two-dots dashed line, the seal member is separated from the surface of the door 12. That is, the rotor chamber 23 opens, and the user can perform an operation in which the rotor 14 is moved into and out of the rotor chamber 23.

The rotor 14 supports, specifically accommodates a sample. The rotor 14 may be made of a metal, a synthetic resin, glass, or the like. Rotors 14 of a plurality of types may be provided according to a type of centrifugal treatment, a type of sample, and the like, and an identifier is provided for each of the rotors 14. Samples may include a mixture of liquids and solids, and a mixture of liquids. The electric motor 15 is provided in the inside F1 of the main body 11, and a rotation shaft 26 of the electric motor 15 is disposed in the rotor chamber 23 through the shaft hole 25. The rotation shaft 26 is connected to the rotor 14, and the rotation shaft 26 and the rotor 14 rotate integrally.

The cooling device 17 is provided in the inside F1 of the main body 11. The cooling device 17 includes a cooling pipe 27, a first pipe 28, a second pipe 29, a third pipe 30, a condenser 31, and a compressor 32. The cooling pipe 27 is wound around an outer periphery of the tubular portion 21 of the accommodation container 13. The first pipe 28 connects the cooling pipe 27 to the condenser 31. The third pipe 30 connects the cooling pipe 27 to the compressor 32. The second pipe 29 connects the compressor 32 to the condenser 31. The compressor 32 compresses a refrigerant into a gaseous state. The refrigerant compressed by the compressor 32 is sent to the condenser 31 via the second pipe 29. The condenser 31 is a heat exchanger which cools and liquefies the refrigerant. The liquid refrigerant flowed out of the condenser 31 is sent to the cooling pipe 27 through the first pipe 28, and heat of the rotor chamber 23 is transferred to the refrigerant through the accommodation container 13 and the cooling pipe 27, and a temperature of the refrigerant in the cooling pipe 27 increases and then the refrigerant vaporizes. The vaporized refrigerant is sent to the compressor 32 through the third pipe 30.

As described above, the cooling device 17 forms a refrigeration cycle in which the refrigerant circulates, and curbs increase in the temperature of the rotor chamber 23. The cooling device 17 has one of or both of an inverter and a flow rate adjustment valve, and an electric motor. A compression pressure or supply amount of the refrigerant can be controlled and thus the temperature of the rotor chamber 23 can be adjusted by controlling the inverter and controlling a rotation speed of the electric motor or the flow rate adjusting valve. The supply amount of the refrigerant can be controlled and the temperature of the rotor chamber 23 can be adjusted by controlling the flow rate adjustment valve.

The vacuum pump 18 is provided in the inside F1 of the main body 11. A suction port of the vacuum pump 18 is connected to the rotor chamber 23 via a suction pipe 33. When the vacuum pump 18 is driven, a pressure inside the rotor chamber 23 is reduced.

The door locking mechanism 16 includes an engaging part 34 mounted on the door 12 and a solenoid 35 provided in the inside Fl of the main body 11. The engaging part 34 includes a protrusion and a hook. The protrusion has a hole or a recessed portion. The solenoid 35 is fixed to the main body 11, and the solenoid 35 has a plunger 36. The plunger 36 is movable in an axial direction. When the solenoid 35 is switched between energization and de-energization between, the plunger 36 is moved in the axial direction. When the plunger 36 is moved in the axial direction, the plunger 36 is engaged with or released from the engaging part 34. The door locking mechanism 16 prohibits the door 12 from opening when the plunger 36 is engaged with the engaging part 34 and the door 12 is in a locked state. The door locking mechanism 16 allows the door 12 to open when the plunger 36 is released from the engaging portion 34 and the door 12 is in an unlocked state.

Figure 2:
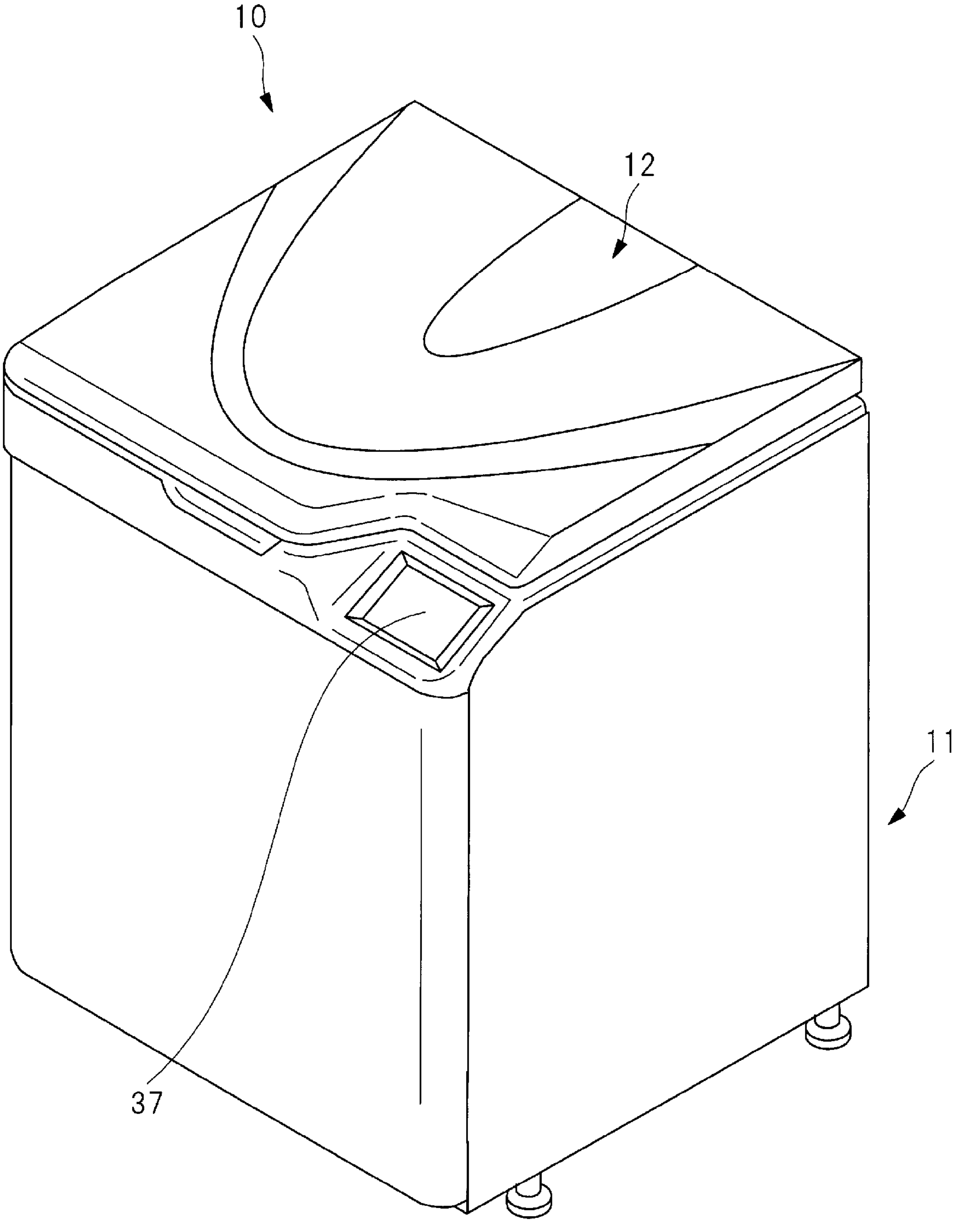
FIG. 2 is a perspective view showing the embodiment of the centrifuge of the invention.

As shown in FIG. 2, an operation display part 37 is provided on the main body 11. The operation display part 37 can be operated by the user and can be seen by the user. The operation display part 37 can display, for example, a normal screen A1 in FIG. 3, a normal screen B1 in FIG. 4, a normal screen C1 in FIG. 5, a normal screen D1 in FIG. 6A, a sub-screen E1 in FIG. 7, a sub-screen E2 in FIG. 8, and the like. A rotation speed display part 38, an operation time display part 39, a temperature display part 40, a start button 41, an open button 42, and the like are displayed on the normal screens A1, B1, and C1.

Further, as shown in FIG. 1, a temperature sensor 43, a rotor distinguishing sensor 44, a door sensor 45, and a rotation speed sensor 46 are provided. The temperature sensor 43 detects the temperature in the rotor chamber 23 and outputs a signal. The rotor distinguishing sensor 44 detects the presence or absence of the rotor 14 by detecting the identifier, distinguishes the type of the rotor 14 and outputs a signal. The door sensor 45 detects whether the door 12 is closed or opened and outputs a signal. The rotation speed sensor 46 detects a rotation speed of the rotation shaft 26, that is, the rotation speed of the rotor 14, and outputs a signal.

A control part 47 is provided in the inside F1 of the main body 11. The control part 47 is a microcomputer having an input interface, an output interface, an execution processing device, a storage device, and the like. The control part 47 can exchange signals with the operation display part 37, and the signals output from the temperature sensor 43, the rotor distinguishing sensor 44, the door sensor 45, and the rotation speed sensor 46 are input to the control part 47. The control part 47 outputs a signal to rotate or stop the electric motor 15, a signal to control the rotation speed of the electric motor 15, a signal control the energization and de-energization of the solenoid 35, and a signal to control the compressor 32.

Figure 3:
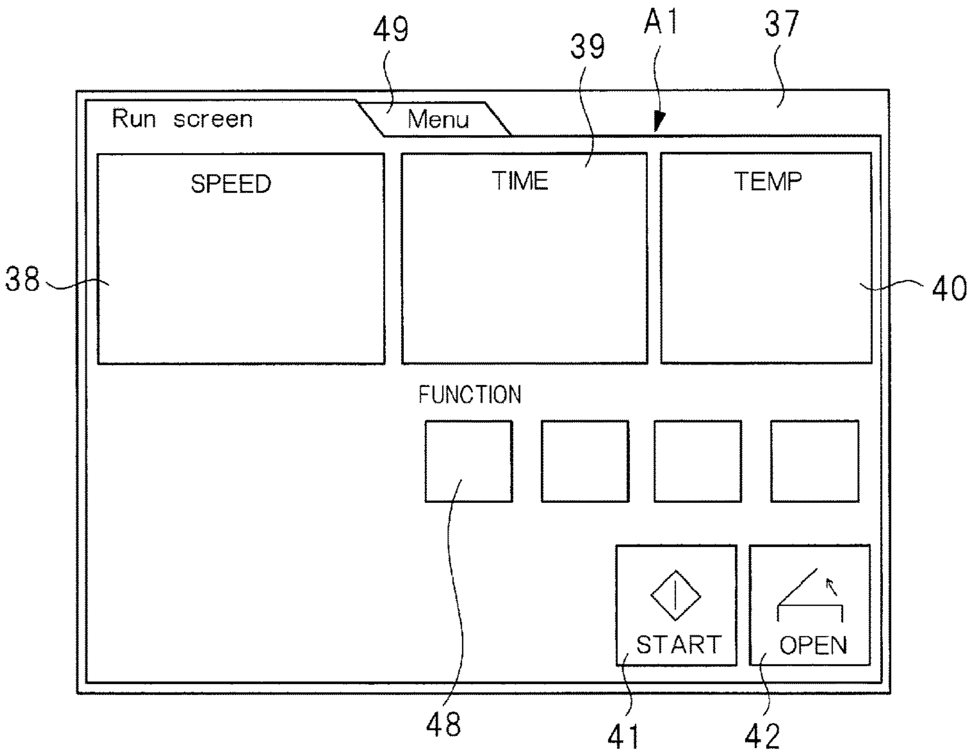
FIG. 3 is a schematic diagram showing a normal screen displayed on an operation display part of the centrifuge.
Figure 4:
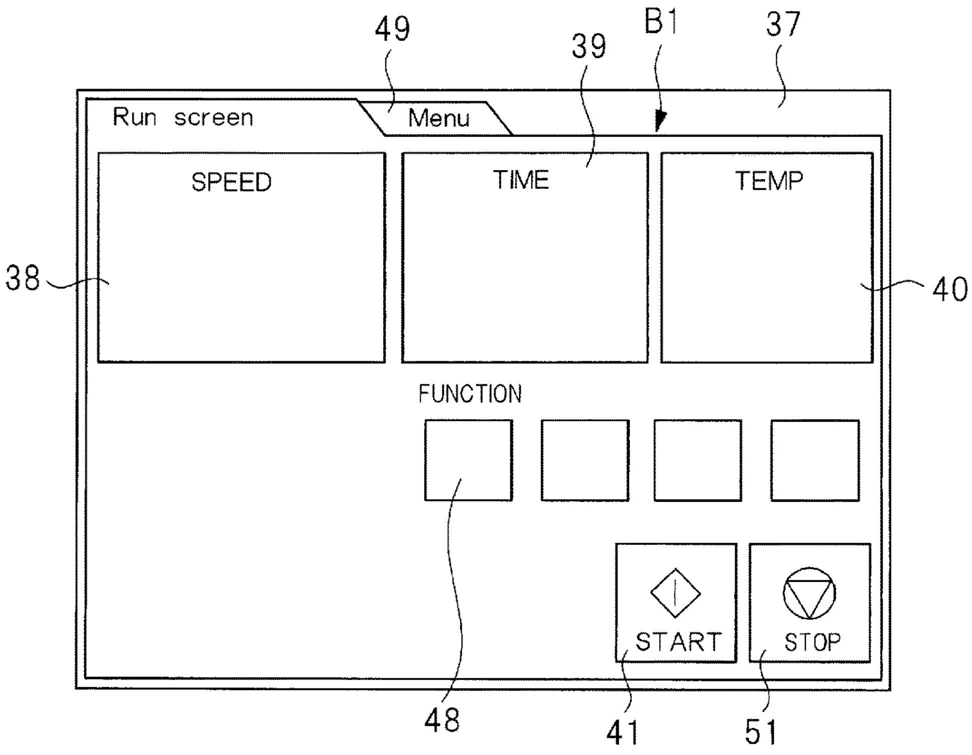
FIG. 4 is a schematic diagram showing a normal screen displayed on the operation display part of the centrifuge.

The user can set the rotation speed of the rotor 14 by operating the rotation speed display part 38 shown in FIG. 3, the user can set an operation time by operating the operation time display part 39, and the user can set the temperature in the rotor chamber 23 by operating the temperature display part 40. The control part 47 may automatically set the rotation speed of the rotor 14 and a target treatment time based on the signal from the rotor distinguishing sensor 44. Further, the user can select different treatment processes for each type of the rotor 14 by operating a program button 48 on the normal screen A1 shown in FIG. 3. The different treatment processes are different in at least one of conditions such as the target treatment time of the centrifugal treatment, the rotation speed of the rotor 14, and the number of rotations and stops of the rotor 14, for example.

Figure 6A:
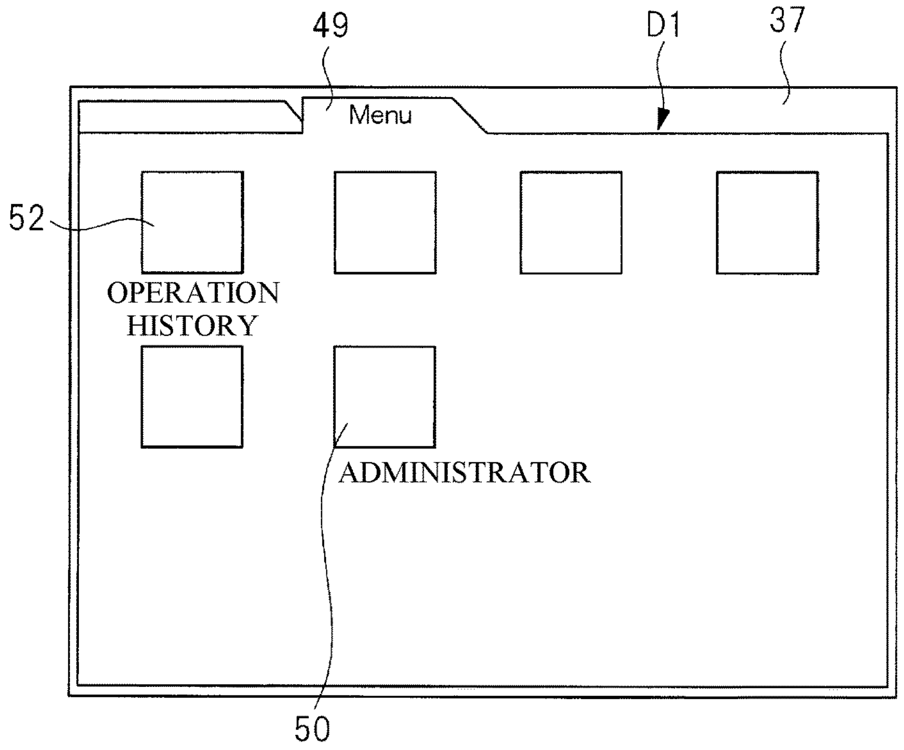
FIG. 6A is a schematic diagram showing a normal screen displayed on the operation display part of the centrifuge.
Figure 6B:
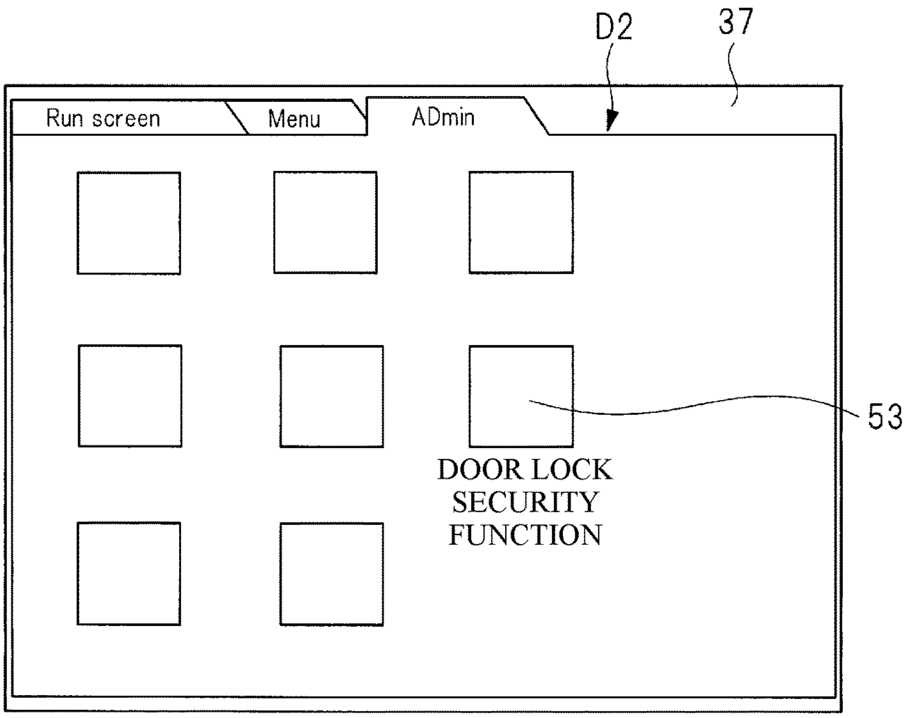
FIG. 6B is a schematic diagram showing an administrator screen displayed on the operation display part of the centrifuge.
Figure 6C:
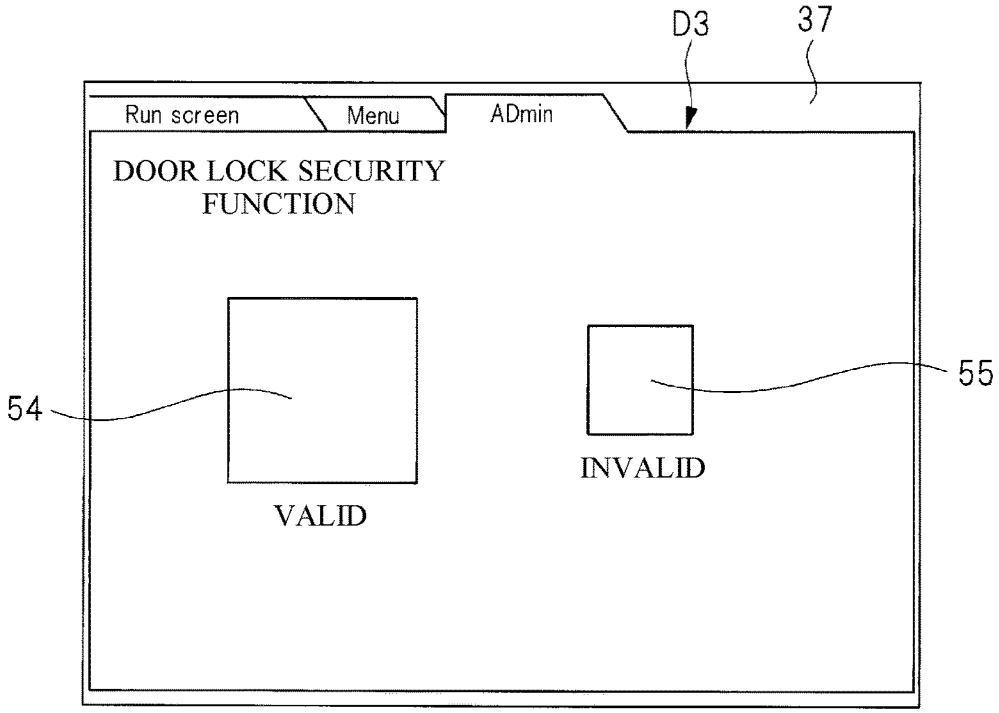
FIG. 6C is a schematic diagram showing an administrator screen displayed on the operation display part of the centrifuge.

When the user operates a menu tab 49 on the normal screen A1 shown in FIG. 3, the normal screen D1 shown in FIG. 6A is displayed. The user can register and delete users who are permitted to login to use the centrifuge 10 and can switch between enabling and disabling a door lock security function by operating an administrator button 50 on the normal screen D1. When the user operates the administrator button 50, an administrator screen D2 shown in FIG. 6B is displayed. When the user operates a door lock security button 53 on the administrator screen D2, the administrator screen D3 shown in FIG. 6C is displayed. The administrator screen D3 includes a valid button 54 and an invalid button 55. When the user operates the valid button 54, the door lock security function is enabled. When the user operates the invalid button 55, the door lock security function is disabled. When the door lock security function is valid, it is necessary to input a passcode when the door locking mechanism 16 in the locked state is switched to the unlocked state. When the door lock security function is disabled, it is not necessary to input the passcode when the door locking mechanism 16 in the locked state is switched to the unlocked state.

Next, a control example of the centrifuge 10 will be described with reference to a flowchart of FIG. 9. When the normal screen A1 in FIG. 3 is displayed, the control part 47 determines whether the door is closed or not in Step S1. When the control part 47 determines NO in Step S1, the control part 47 continues the determination in Step S1. When the control part 47 determines YES in Step S1, the control part 47 proceeds to Step S2 and sets the door locking mechanism 16 in the locked state. The control part 47 determines whether or not the rotor 14 is present in Step S3. When the control part 47 determines YES in Step S3, the control part 47 determines whether or not the door lock security function is enabled in Step S4.

Figure 7:
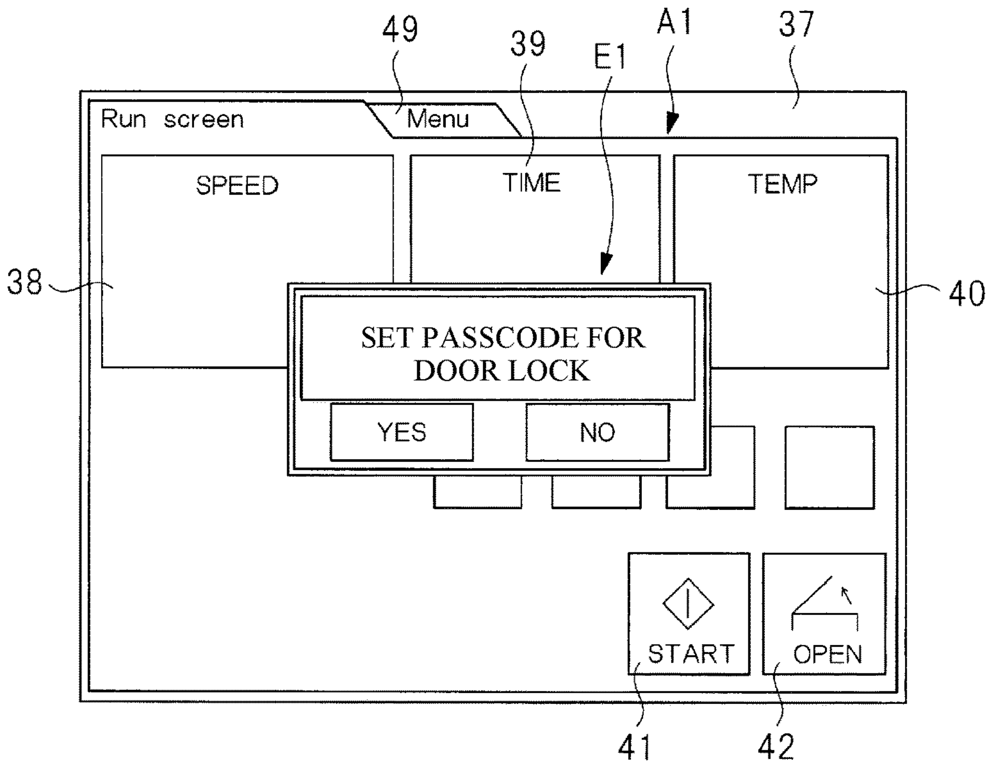
FIG. 7 is a schematic diagram showing a sub screen displayed on the operation display part of the centrifuge.

When the control part 47 determines YES in Step S4, the control part 47 proceeds to Step S5 and displays the sub-screen E1 in FIG. 7. The user operates the sub-screen E1 and selects "whether or not it is necessary to set a passcode used when the door lock function is released." In Step S6, the control part 47 determines whether or not an operation in which a passcode is input has been performed. As the passcode, for example, a 4-digit number can be input. When the control part 47 determines YES in Step S6, the control part 47 controls the operation display part 37 to display the sub-screen E2 in Step S7. Further, when the user sets a passcode on the sub-screen E2, the control part 47 controls the operation display part 37 to display the normal screen C1 in FIG. 5.

In Step S8, the control part 47 determines whether or not the user has operated a start button 41 on the normal screen C1. When the control part 47 determines YES in Step S8, the control part 47 controls the operation display part 37 to display the normal screen B1 of FIG. 4 in Step S9 and rotates the electric motor 15. The rotor 14 rotates together with the electric motor 15, and the sample in the rotor 14 is centrifuged. Centrifugal treatments include precipitation separation, purification, concentration, and the like of a sample.

The control part 47 determines whether or not centrifugation of the sample has been completed in Step S10. Whether or not the centrifugation of the sample has been completed can be determined, for example, by determining whether or not an elapsed time since the rotor 14 started rotating has reached a set operation time of the sample. The set operation time may be any one of a value set by the user operating the operation time display part 39 in FIG. 3, a value automatically set by the control part 47 according to the type of the rotor 14, and a value set by the user operating the program button 48 on the normal screen A1 in FIG. 3.

When the control part 47 determines NO in Step S10, the process proceeds to Step S9. When the control part 47 determines YES in Step S10, the user operates a stop button 51 on the normal screen B1 in FIG. 4 to decrease the rotation speed of the rotor 14 and then determines whether or not the rotor 14 has stopped. When the control part 47 determines NO in Step S11, the control part 47 continues the determination in Step S11.

Figure 5:
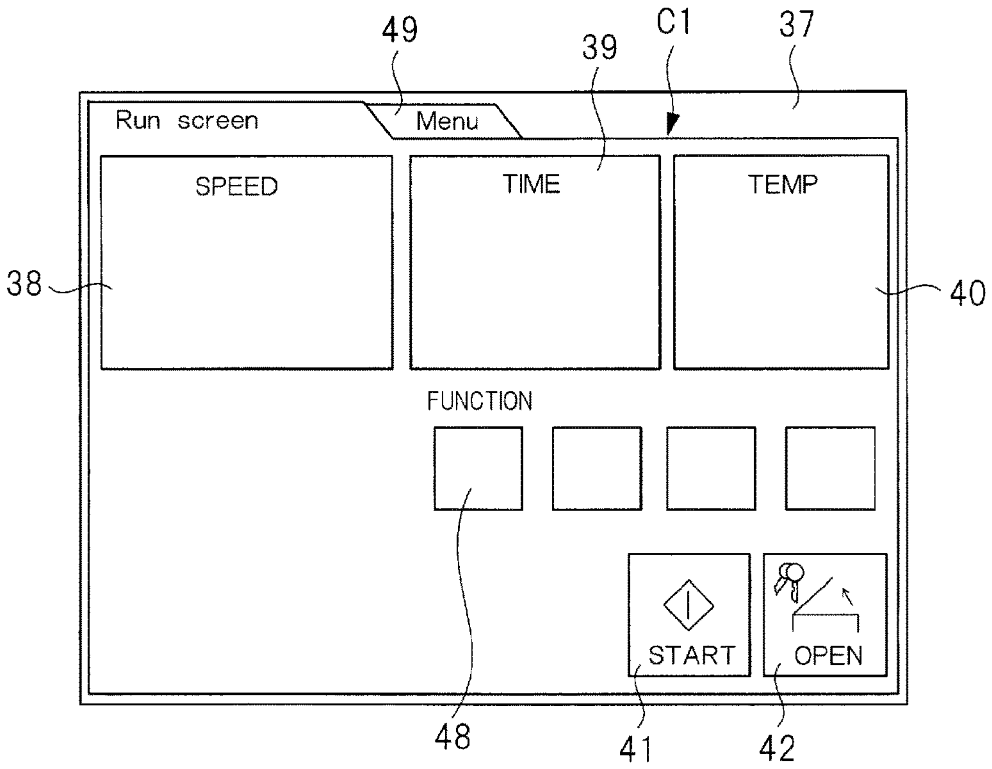
FIG. 5 is a schematic diagram showing a normal screen displayed on the operation display part of the centrifuge.

When the control part 47 determines YES in Step S11, the control part 47 controls the operation display part 37 to display the normal screen C1 in FIG. 5 and determines whether or not the user has operated the open button 42 on the normal screen C1 in Step S12. The open button 42 on the normal screen C1 also displays a key mark. Therefore, the user can recognize that the door lock security function is enabled.

When the control part 47 determines NO in Step S12, the control part 47 continues the determination in Step S12. When the control part 47 determines YES in Step S12, the control part 47 determines whether or not a passcode is to be set in Step S13.

Figure 8:
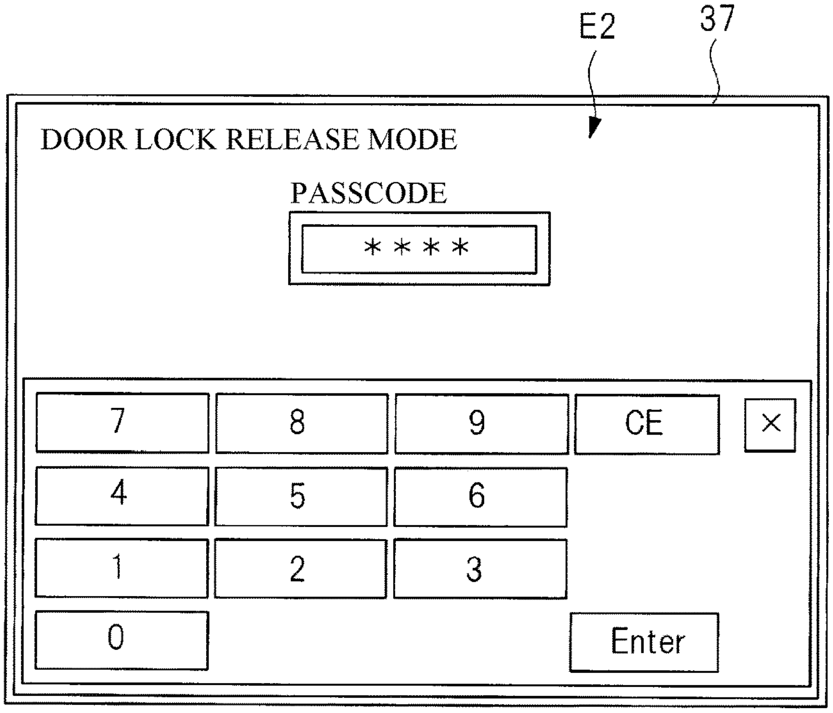
FIG. 8 is a schematic diagram showing a sub screen displayed on the operation display part of the centrifuge.

When the control part 47 determines YES in Step S13, the control part 47 controls the operation display part 37 to display the sub-screen E2 of FIG. 8 in Step S14, and the user inputs a passcode on the sub-screen E2. In Step S15, the control part 47 determines whether or not the passcode input by the user in Step S14 is correct. When the passcode set in Step S7 and the passcode input in Step S14 do not match, the control part 47 determines NO in Step S15 and proceeds to Step S14.

When the passcode set in Step S7 and the passcode input in Step S14 match each other, the control part 47 determines YES in Step S15, proceeds to Step S16 and clears, that is, invalidates the stored passcode, that is, the passcode set in Step S7. Further, the control part 47 sets the door locking mechanism 16 in the unlocked state in Step S17, controls the operation display part 37 to display the normal screen A1 in FIG. 3 and ends the control example in FIG. 9.

When the control part 47 determines NO in Step S13, the control part 47 proceeds to Step S17. When the control part 47 determines NO in Step S8, the control part 47 proceeds to Step S12. When the control part 47 determines NO in Step S3, or when the control part 47 determines No in Step S4, or when the control part 47 determines No in Step S6, the control part 47 performs a process of "no passcode setting" in Step S18 and proceeds to Step S8.

Figure 9:
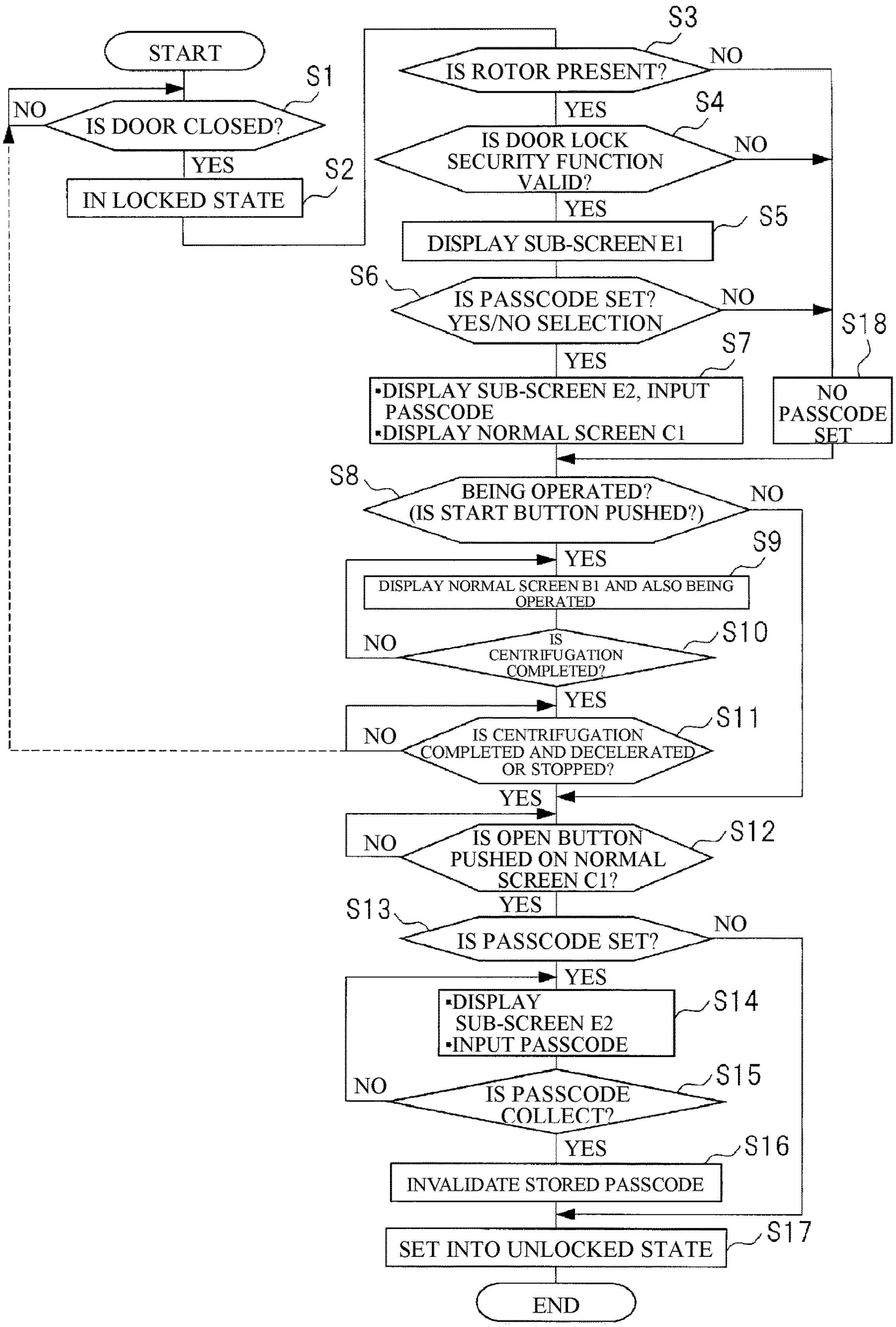
FIG. 9 is a flowchart showing a control example of the centrifuge.

Although not shown in the control example of FIG. 9, the control part 47 stores a usage history of the centrifuge 10. The usage history of the centrifuge 10 includes dates and times when the door 12 was opened, dates and times when the rotor 14 was moved out of the rotor chamber 23, dates and times when the user set the passcode in Step S7, and a history thereof, that is dates and times when inputting of the passcode was performed by the user in Step S14. The control part 47 can detect that the rotor 14 has been moved out of the rotor chamber 23 by processing the signal of the rotor distinguishing sensor 44. Additionally, when the user operates an operation history button 52 on the normal screen D1 in FIG. 6A, the control part 47 controls the opertion display part 37 to displays the stored usage history of the centrifuge 10.

Figure 12:
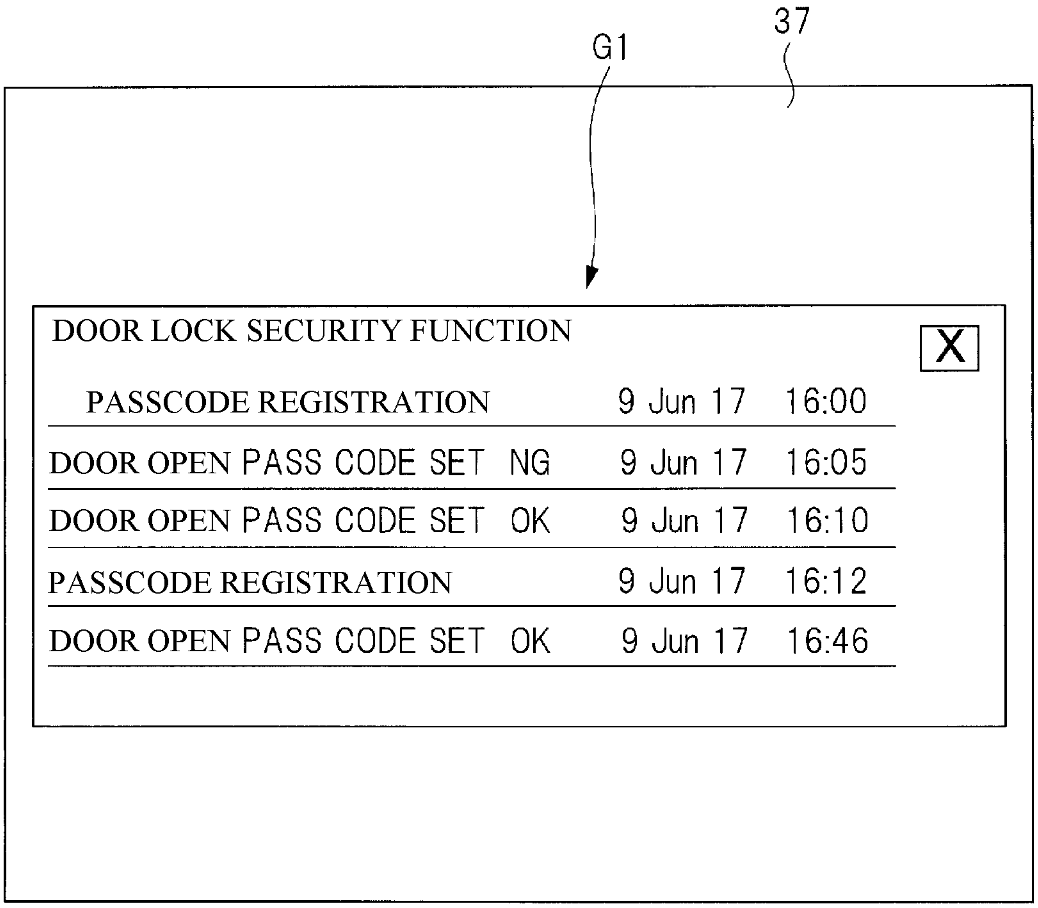
FIG. 12 is a schematic diagram showing a history screen displayed on the operation display part of the centrifuge.

FIG. 12 is an example of a history screen G1 showing a history of the door lock security function. Passcode registration dates and times, and correct and incorrect input dates and times of the input passcode are displayed in the history screen G1. In the history screen G1, "OK" means that a correct passcode has been input, and "NG" means that an incorrect passcode has been input. The user can ascertain an opening and closing history of the door 12 of the centrifuge 10 by reading the history screen G1. That is, the user can check whether or not a predetermined user has opened or closed the door 12 at a predetermined timing, and thus security of the centrifuge 10 is improved.

Figure 10:
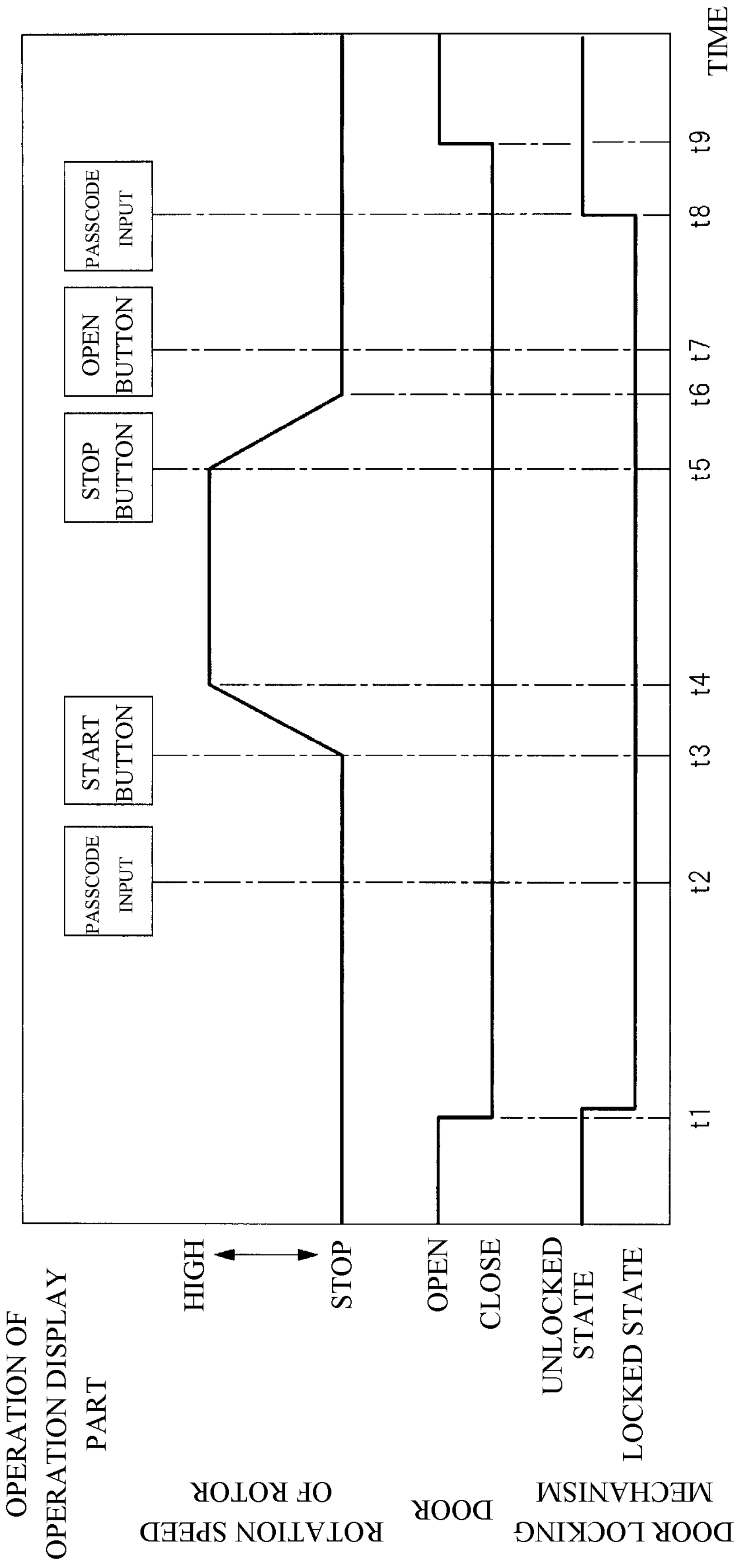
FIG. 10 is a time chart showing the control example of the centrifuge.

FIG. 10 is a time chart showing the treatment processes of the centrifuge 10. The treatment processes shown in FIG. 10 are examples in which the rotation and stop of the rotor 14 are performed once to complete the centrifugation. The door is open at a time before time t1, the door locking mechanism is in the unlocked state, and the rotor is stopped. When the door is closed at time t1, the door locking mechanism is controlled to be in the locked state. The passcode is input at time t2, the start button is operated at time t3, and the rotor rotates.

The rotation speed of the rotor is controlled to be constant after time t4. When the user operates the stop button at time t5, the rotation speed of the rotor decreases. The rotor is stopped at time t6. When the user operates the open button at time t7 and the user inputs a passcode at time t8, the door locking mechanism is controlled to be in the unlocked state. The user opens the door at time t9.

As described above, when the rotor 14 accommodated in the rotor chamber 23 is stopped, in Step S12, the control part 47 detects that the user has operated the open button 42 as a preliminary operation of setting the door locking mechanism 16 to be in the unlocked state. Additionally, when the passcode is input in Step S14, the control part 47 sets the door locking mechanism 16 to be in the unlocked state. Further, when the control part 47 determines NO in Step S3, proceeds to Step S12 via Step S18 and detects that the open button 42 is operated, the control part 47 determines NO in Step S13, proceeds to Step S17 and sets the door locking mechanism 16 to the unlocked state. Therefore, the door 12 can be opened without inputting the passcode while the rotor 14 is not in the rotor chamber 23, and user operability is improved.

Also, when the control part 47 determines NO in Step S6 and determines NO in Step S13 via Step S18, the door 12 can be opened without inputting the passcode, and the user operability is improved.

Furthermore, even in the case in which the rotor 14 is stopped, when the passcode input in Step S7 does not match the passcode input in Step S14, the control part 47 holds the door locking mechanism 16 in the locked state. Therefore, it is possible to prevent a person who does not know the passcode from opening the door 12 when the rotor 14 is accommodated in the rotor chamber 23. That is, security against theft and foreign matter contamination of the sample in the rotor to be centrifuged is improved. In addition, the security of the rotor 14 can be improved only by software, and an increase in cost due to addition of hardware devices can be minimized.

Figure 11:
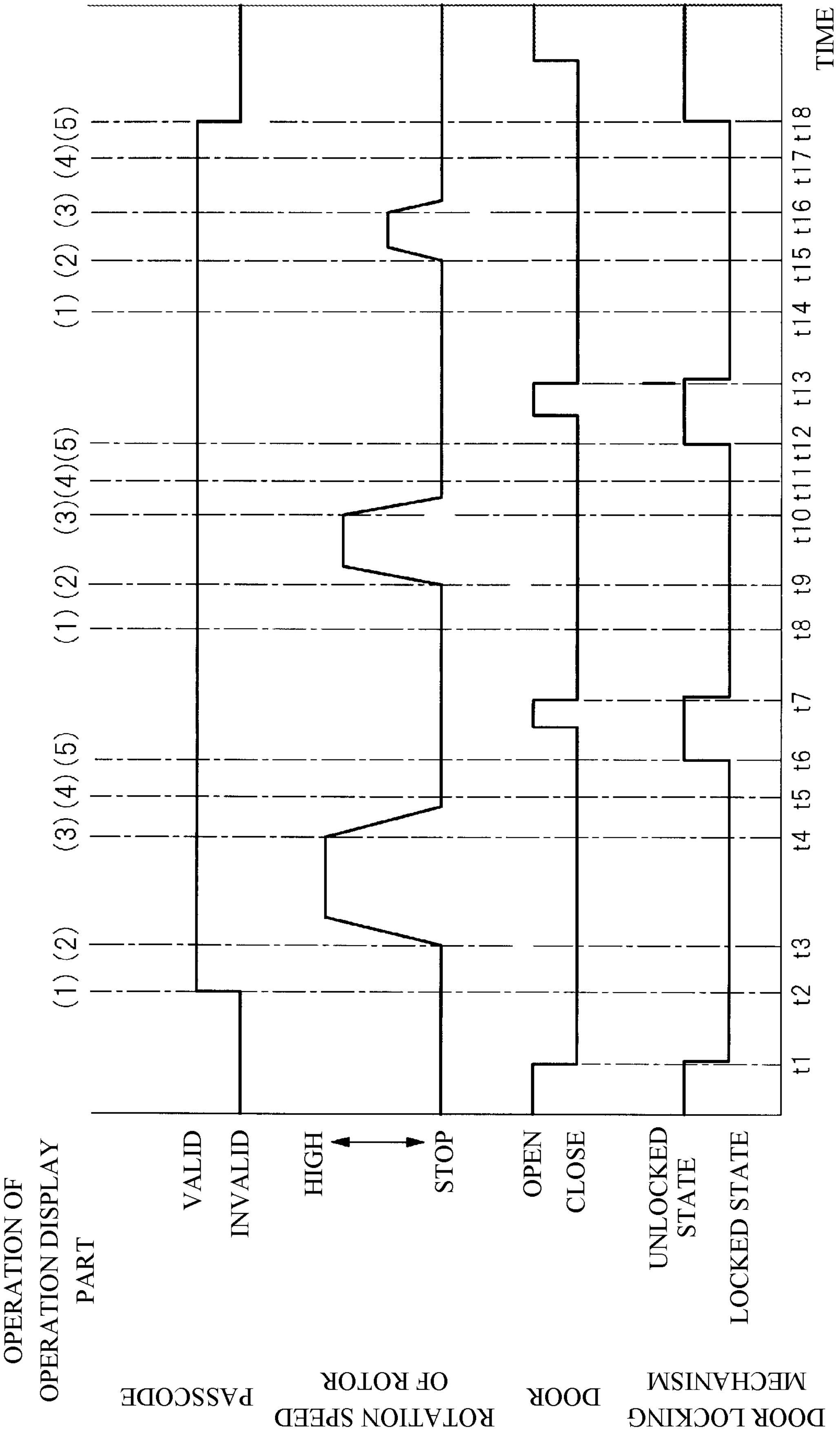
FIG. 11 is a time chart showing another control example of the centrifuge.

FIG. 11 is a time chart corresponding to another treatment process of the centrifuge. A treatment process shown in FIG. 11 is an example of a program operation in which each of the rotation and stop of the rotor 14 is repeated a plurality of times, specifically, three times to complete the centrifugation. In FIG. 11, (1) represents the input of the passcode performed in Step S7 of FIG. 9, (2) represents the operation of the start button, (3) represents the operation of the stop button, (4) represents the operation of the open button, and (5) represents the input of the passcode performed in Step S14 of FIG. 9.

When the door is closed at time t1 and the passcode is input at time t2, the door locking mechanism is in the locked state. The start button is operated at time t3, and the first rotation of the rotor starts. The stop button is operated at time t4, and the rotor is stopped for the first time. The open button is operated at time t5, the passcode is input at time t6, and the door locking mechanism is in the unlocked state.

Thereafter, when the user opens the door and the door is closed at time t7, the door locking mechanism is in the locked state. A passcode is input at time t8. The passcode input at time t8 may be the same as or different from the passcode input at time t2. When the passcode input at time t8 is different from the passcode input at time t2, the passcode input at time t8 is valid, and the passcode input at time t2 is invalid.

When the start button is operated at time t9, the second rotation of the rotor starts. The stop button is operated at time t10, and the rotor is stopped for the second time. When the open button is operated at time t11 and the passcode is input at time t12, the door locking mechanism is in the unlocked state.

Furthermore, when the user opens the door and the door is closed at time t13, the door locking mechanism is in the locked state. A passcode is input at time t14. The passcode input at time t14 may be the same as or different from the passcode input at time t8. When the passcode input at time t14 is different from the passcode input at time t8, the passcode input at time t14 is valid, and the passcode input at time t8 is invalid.

When the start button is operated at time t15, the third rotation of the rotor starts. The stop button is operated at time t16, and the rotor is stopped for the third time. When the open button is operated at time t17 and the passcode is input at time t18, the door locking mechanism is in the unlocked state. In addition, all passcodes input before time t18 are invalid.

In the example of the treatment process shown in FIG. 11, each of the rotation and stop of the rotor 14 is performed three times to complete the centrifugation. Therefore, the latest passcode is valid among passcode input between time t2 and time t18.

Furthermore, even when the first operation of the stop button is performed at time t4 in FIG. 11 or when the second operation of the stop button is performed at time t10, the control part 47 determines NO in Step S11 of FIG. 9 and proceeds to Step S1 in a routine indicated by a broken line in FIG. 9. Additionally, when the control part 47 detects the third operation of the stop button at time t16 and detects that the rotor 14 has stopped, the control part 47 determines YES in Step S11 of FIG. 9.

FIGS. 9 and 10 are examples in which the user operates the stop button 51 and the rotation speed of the rotor 14 decreases. Further, FIG. 11 shows an example in which the control part 47 determines that the centrifugation is completed when the set operation time has elapsed and automatically reduces the rotation speed of the rotor 14.

The meaning of the items described in the embodiment will be described. The rotor distinguishing sensor 44 and the control part 47 are examples of presence and absence detection parts, and the rotation speed sensor 46 and the control part 47 are examples of stop detection parts. The operation of the open button is an example of an operation of setting the locking mechanism to be in the unlocked state. The passcode input by the user in Step S7 is an example of a passcode for locking. The passcode input by the user in Step S14 is an example of a passcode for unlocking. The control part 47 is an example of a first control part, a second control part, a third control part, a fourth control part, and a storage part.

The centrifuge is not limited to the above-described embodiment, and various modifications can be made without departing from the gist thereof. For example, the program operation may be a treatment process in which each of the rotation and stop of the rotor is performed twice to complete the centrifugation, and a treatment process in which each of the rotation and stop of the rotor is performed four times or more to complete the centrifugation.

The passcode input by the user may be a five-digit number or more in addition to a four-digit number. The passcode may be a character or a symbol in addition to a number. Further, the passcode may be a combination of at least two types of numbers, characters, and symbols.

A passcode input and release format may be a second input format using a non-contact medium in addition to a first input format in which the user operates the operation display part. In the second input format, a receiving part is provided in the main body of the centrifuge, and the receiving part recognizes a readable and writable IC card. In the case of the second input format, passcode information in the IC card may be renewed whenever the passcode is input and released.

The centrifuge shown in FIG. 1 is provided with the control part and the operation display part in the main body, and signals are exchanged between the operation display part and the control part. On the other hand, the centrifuge may have an external device provided separately from the main body. The external device can exchange signals with the control part of the main body by wire or wireless. The user performs the input of a passcode, the operation of the start button, the operation of the open button, the operation of the stop button, and the like by operating an external device. The external device includes a personal computer which is installed and used on a table in addition to a smartphone and a tablet which can be carried by a user.

REFERENCE SIGNS LIST

10 Centrifuge
12 Door
14 Rotor
16 Door locking mechanism
23 Rotor chamber
44 Rotor distinguishing sensor
46 Rotation speed sensor
47 Control part

What is claimed is:

1. A centrifuge, comprising:
a rotor chamber that accommodates a rotor which supports a sample;
a door that opens and closes the rotor chamber;
a displayer that displays an operation state;
a door sensor configured to detect whether the door is opened or closed;
a rotor distinguishing sensor configured to detect whether the rotor is accommodated in the rotor chamber or not;
a lock, switching between a locked state that opening of the door is prevented and an unlocked state that the opening of the door is allowed; and
a controller connected to at least the door sensor and the rotor distinguishing sensor and configured to set the lock to be in the unlocked state when an operation for setting the lock to be in the unlocked state is performed and a passcode is input,
wherein when the rotor distinguishing sensor has detected the rotor is accommodated in the rotor chamber, and the door sensor has detected the door is closed, the controller is configured to make a first selection screen being displayed on the displayer when the operation for setting the lock to be in the unlocked state is performed, so that a user inputs the passcode through the first selection screen to set the lock in the unlocked state, and,
when the rotor distinguishing sensor has not detected that the rotor is accommodated in the rotor chamber, and the door sensor has detected the door is closed, the controller is configured to set the lock in the unlocked state without making the user to input the passcode through a second selection screen displayed on the displayer, or the controller is configured to set the lock in the unlocked state without displaying the second selection screen.

2. The centrifuge according to claim 1, comprising a stop detector, detecting whether or not the rotor accommodated in the rotor chamber is stopped,
wherein the controller is configured to sets the lock to be in the unlocked state when the operation for setting the lock to be in the unlocked state is performed and the passcode is input in a case that the rotor accommodated in the rotor chamber is stopped is determined by a signal from the stop detector.

3. The centrifuge according to claim 1, wherein the controller is configured to set the lock to be in the unlocked state without requesting the input of the passcode when the operation for setting the lock to be in the unlocked state is performed after determined that the door is closed in the locked state, the rotor is not accommodated in the rotor chamber and no passcode is to be set.

4. The centrifuge according to claim 1, further comprising a memory that stores the passcode that is inputted, and
wherein when the operation for setting the lock to be in the unlocked state is performed, the passcode is input and the lock is set to be in the unlocked state, the controller is configured to clear the passcode that is stored in the memory.

5. The centrifuge according to claim 1, comprising a memory, storing an input history of the passcode.

6. The centrifuge according to claim 1, wherein the operation state is a rotation speed, and
when the rotor is accommodated in the rotor chamber that is closed by the door, the controller is configured to make an input set screen being displayed on the displayer, so that input set screen displays the passcode that is inputted when the operation for setting the lock to be in the unlocked state is performed.

7. The centrifuge according to claim 1, wherein the operation state is a rotation speed, and when the passcode is set, the displayer is configured to display a mark to indicate that the passcode is set.

8. A centrifuge, comprising:

a rotor chamber that accommodates a rotor which supports a sample;

a rotor distinguishing sensor configured to detect whether the rotor is accommodated in the rotor chamber or not;

a door that opens and closes the rotor chamber;

a door sensor configured to detect whether the door is opened or closed;

a lock, switching between a locked state that opening of the door is prevented and an unlocked state that the opening of the door is allowed; and a controller connected to at least the door sensor and the rotor distinguishing sensor and configured to set the lock to be in the unlocked state when an operation for setting the lock to be in the unlocked state is performed and a passcode is input, wherein the controller is configured to be able to select whether or not to request an input of the passcode for setting the unlocked state when the operation for setting the locking mechanism to be in the unlocked state is performed, wherein the controller is configured to set the lock to be in the unlocked state without requesting the input of the passcode when the operation for setting the lock to be in the unlocked state is performed in a case that the rotor distinguishing sensor has detected that the rotor is not accommodated in the rotor chamber, and the door is closed, the controller is configured to set the lock to be in the unlocked state with requesting the input of the passcode when the operation for setting the lock to be in the unlocked state is performed in a case that the rotor distinguishing sensor has detected that the rotor is accommodated in the rotor chamber, and the door is closed.

* * * * *